(12) United States Patent
Takeuchi et al.

(10) Patent No.: US 9,113,424 B2
(45) Date of Patent: *Aug. 18, 2015

(54) WIRELESS COMMUNICATION SYSTEM AND METHOD FOR WIRELESS COMMUNICATION

(71) Applicant: Hitachi, Ltd., Tokyo (JP)

(72) Inventors: Keisuke Takeuchi, Yokohama (JP); Rintaro Katayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,431

(22) Filed: Aug. 22, 2014

(65) Prior Publication Data

US 2014/0364122 A1 Dec. 11, 2014

Related U.S. Application Data

(63) Continuation of application No. 13/283,128, filed on Oct. 27, 2011, now Pat. No. 8,849,281.

(30) Foreign Application Priority Data

Nov. 19, 2010 (JP) .................................. 2010-259435

(51) Int. Cl.
*H04W 36/00* (2009.01)
*H04W 52/24* (2009.01)
(Continued)

(52) U.S. Cl.
CPC ............ *H04W 52/244* (2013.01); *H04W 36/20* (2013.01); *H04W 36/30* (2013.01); *H04W 16/14* (2013.01); *H04W 24/10* (2013.01); *H04W 84/045* (2013.01)

(58) Field of Classification Search
CPC ... H04W 52/244; H04W 36/30; H04W 36/20; H04W 24/10; H04W 84/045; H04W 16/14
USPC ............... 455/436–444, 422.1–425, 446–449
See application file for complete search history.

(56) References Cited

U.S. PATENT DOCUMENTS 8,600,370 B2 * 12/2013 Choudhury et al. ....... 455/422.1
2004/0214575 A1 10/2004 Jovanovic
(Continued)

FOREIGN PATENT DOCUMENTS

CN 1541025 A 10/2004
EP 2 136 593 A2 12/2009
(Continued)

*Primary Examiner* — Sharad Rampuria
(74) *Attorney, Agent, or Firm* — Foley & Lardner LLP

(57) ABSTRACT

When a femto cell base station detects an intense uplink interference, the femto cell base station autonomously extends the femto cell so as to raise a probability that a mobile terminal around the original femto cell may be connected to the femto cell base station. If the mobile terminal connects to the femto cell base station, the uplink interference is reduced and total throughput is improved. Additionally, if a resultant effect of interference reduction is low, the femto cell base station returns the mobile terminal, which is connected to the femto cell base station due to the extension of the femto cell, to the original connection destination. If an evaluative criterion meets a predetermined condition, the femto cell base station restores the extended femto cell to the original size. These actions prevent degradation of performance caused by concentration of the connections of mobile terminals to the femto cell base station.

10 Claims, 16 Drawing Sheets

(51) Int. Cl.
*H04W 36/20* (2009.01)
*H04W 36/30* (2009.01)
*H04W 16/14* (2009.01)
*H04W 24/10* (2009.01)
*H04W 84/04* (2009.01)

(56) References Cited

U.S. PATENT DOCUMENTS

| 2004/0229621 | A1 | 11/2004 | Misra |
| 2009/0305741 | A1 | 12/2009 | Takeuchi et al. |
| 2009/0318182 | A1 | 12/2009 | Nagato et al. |
| 2010/0182972 | A1 | 7/2010 | Katayama et al. |
| 2010/0238876 | A1 | 9/2010 | Yamamoto et al. |
| 2010/0273432 | A1 | 10/2010 | Meshkati et al. |
| 2010/0309864 | A1 | 12/2010 | Tamaki et al. |
| 2010/0309866 | A1 | 12/2010 | Katayama et al. |
| 2011/0244863 | A1 | 10/2011 | Matsuo et al. |
| 2011/0319084 | A1 | 12/2011 | Meshkati et al. |
| 2012/0077486 | A1 | 3/2012 | Park et al. |

FOREIGN PATENT DOCUMENTS

| JP | 2006-074468 A | 3/2006 |
| JP | 2009-302614 | 12/2009 |
| JP | 2010-004187 A | 1/2010 |
| JP | 2010-103753 | 5/2010 |
| JP | 2010-171558 | 8/2010 |
| JP | 2010-171885 | 8/2010 |
| JP | 2010-220018 | 9/2010 |
| JP | 2010-283632 | 12/2010 |
| JP | 2010-283634 | 12/2010 |
| KR | 1020065362 A | 1/2006 |
| WO | WO 2010/070854 A1 | 6/2010 |

* cited by examiner

F I G . 2
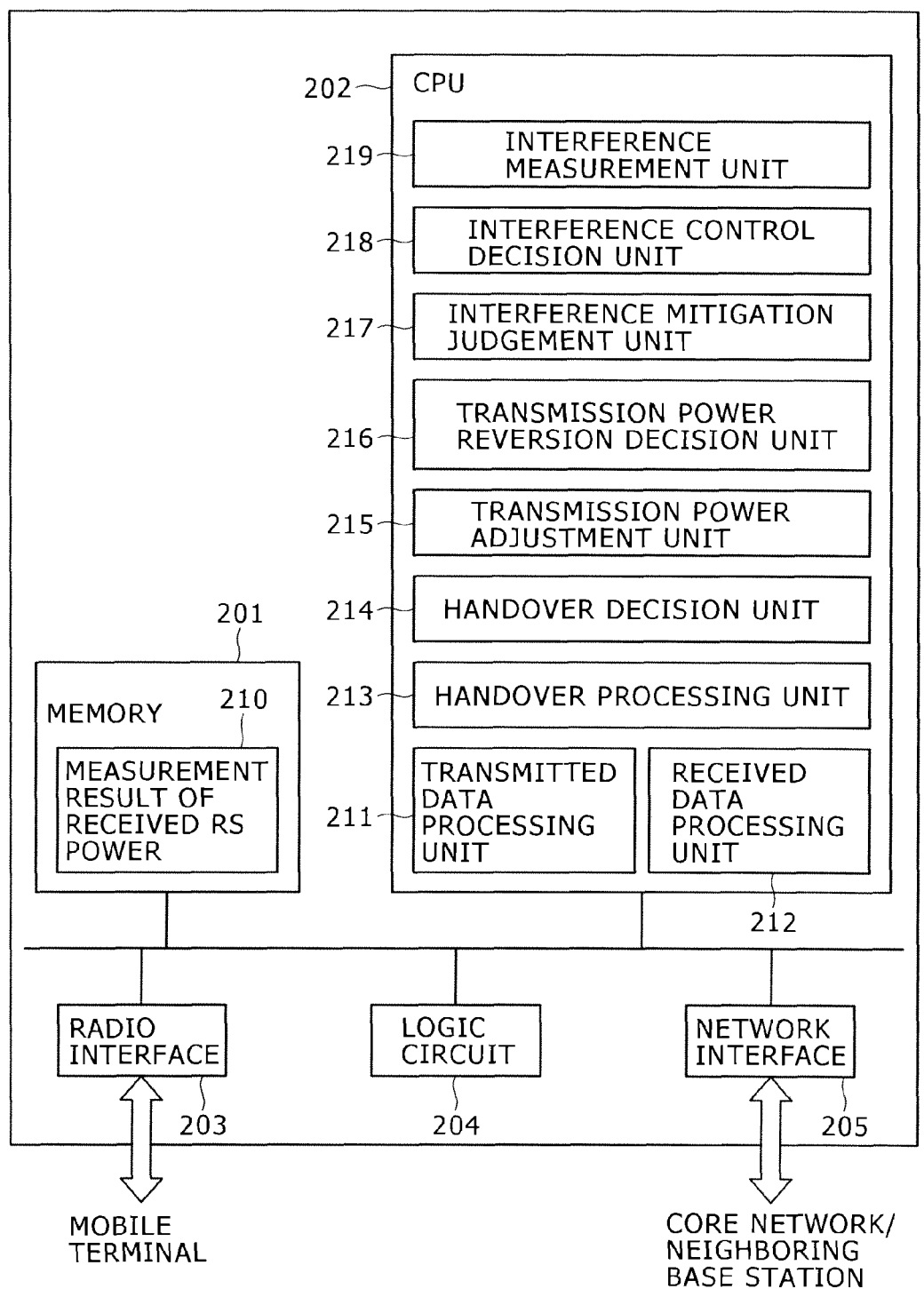

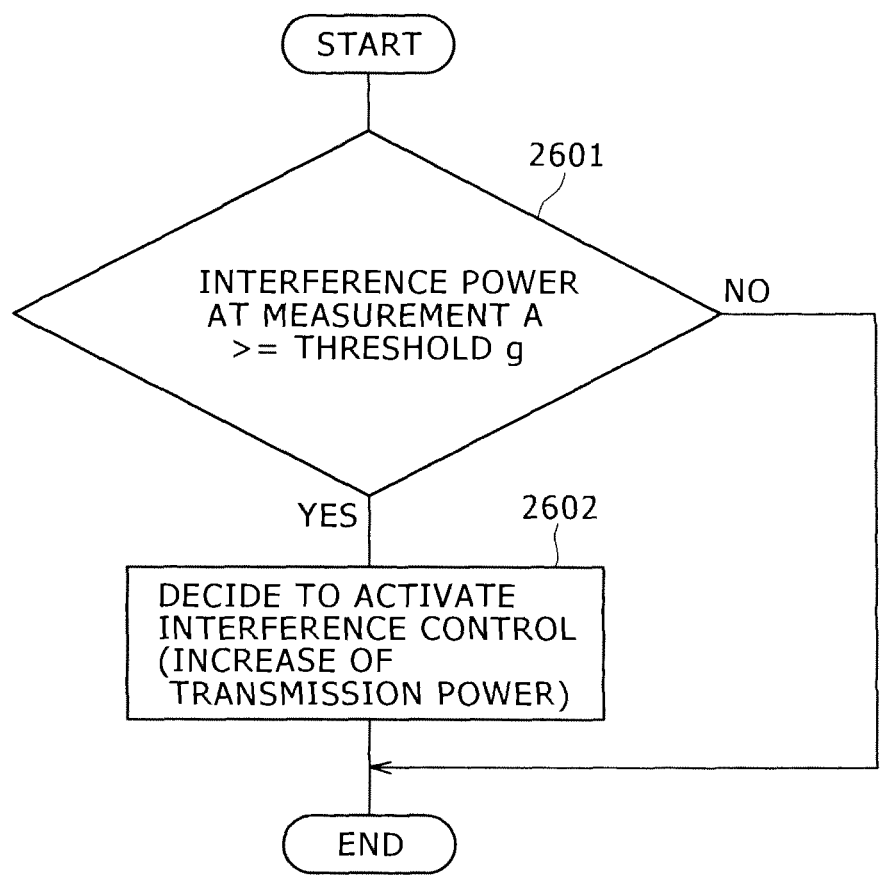

WIRELESS COMMUNICATION SYSTEM AND METHOD FOR WIRELESS COMMUNICATION

CROSS-REFERENCE TO RELATED PATENT APPLICATIONS

Japan Priority Application 2010-259435, filed Nov. 19, 2010 including the specification, drawings, claims and abstract, is incorporated herein by reference in its entirety. This application is a Continuation of U.S. application Ser. No. 13/283,128, filed Oct. 27, 2011, incorporated herein by reference in its entirety.

BACKGROUND OF THE INVENTION

1. Field of the Invention

The present invention relates to a wireless communication system and a method for wireless communication, or more particularly, to a cellular wireless communication system including small-scale base stations (for example, femto cell base stations) and a method for a cellular wireless communication.

2. Description of the Related Art

In cellular wireless communication systems for cellular portable phones or the like, a macro cell method in which one base station covers a wide area has been employed in the past. The macro cell method features its adaptability to high-speed movement due to a low handover frequency and its capability to expand an area using a small number of base stations. However, the macro cell method finds it hard to cope with a dead zone created indoors or locally.

In contrast, an approach to elimination of the dead zone by installing a base station, which provides a cell smaller than a macro cell, in a place where radio waves from a macro cell base station are hard to reach has been conceived.

In particular, a femto cell method in which a small-scale base station capable of covering, for example, one house is installed in each household is attracting attention these days. In a so-called third-generation cellular wireless communication system employing the Wideband Code Division Multiple Access (W-CDMA) or Evolution Data Optimized (EV-DO), provision of commercial services according to the femto cell method is beginning.

In addition, for the Long Term Evolution (LTE) that is the standard succeeding W-CDMA, specifications for the femto cell method are formulated.

In the femto cell method, a small-scale base station (femto cell base station) that covers a radio-wave propagation range nearly identical to the range covered by a wireless LAN is installed in each household or building, and the femto cell base station is connected onto a cellular communication network over the Internet. For the purpose of eliminating the dead zone, the femto cell base station may be used in such a manner that a femto cell locally overlaps a macro cell. A frequency band employed by the femto cell base station is identical to or overlaps a frequency band employed by a macro cell base station.

SUMMARY OF THE INVENTION

Assuming that cells provided by two base stations which share the same frequencies overlap, an uplink signal to be transmitted from a mobile terminal connected to one of the base stations becomes an interference signal to an uplink signal to be received by the other base station.

Now, assume that a mobile terminal connected to a macro cell base station is located in the vicinity of a femto cell that overlaps a macro cell concerned. In a cellular wireless communication system, as a mobile terminal recedes from a base station that is a connection destination, the mobile terminal transmits an uplink signal with a larger power. This is intended to ensure receiving quality required by the base station. Therefore, the mobile terminal transmits the uplink signal to the macro cell base station, which is separated from the mobile terminal by a long distance, with the large power. Further, since a distance from the mobile terminal to a femto cell base station is short, the uplink signal transmitted from the mobile terminal reaches the femto cell base station without a large decay. Therefore, the uplink signal sent from the mobile terminal becomes a very intense interference signal to the femto cell base station. As a result, presumably, the receiving quality of the uplink signal at the femto cell base station may be markedly degraded, and an uplink throughput in the femto cell may be decreased.

As a solution for the foregoing problem, Japanese Unexamined Patent Application Publication No. 2010-171885 has disclosed a method in which a macro cell base station posts information on radio resources, which the macro cell base station has allocated to subordinate mobile terminals, to a femto cell base station, and the femto cell base station in turn allocates radio resources, which the macro cell base station has not allocated, to mobile terminals. Accordingly, a situation in which an uplink signal sent from a mobile terminal connected to the macro cell base station becomes an interference signal to the femto cell base station can be avoided.

However, as described in Japanese Unexamined Patent Application Publication No. 2010-171885, according to the method of exchanging information between base stations, an information exchange frequency increases along with an increase in the number of femto cell base stations located in a macro cell. Eventually, a load on a network increases.

In order to solve the problem of an uplink interference, which is applied to a femto cell base station by a mobile terminal connected to a macro cell base station, without exchanging information among base stations, connecting the mobile terminal, which acts as a source of interference signal, to the femto cell base station is thought to be effective. When the mobile terminal is connected to the femto cell base station, the uplink signal sent from the mobile terminal does not any longer become an interference signal to the femto cell base station. In contrast, the uplink signal from the mobile terminal becomes an interference signal to the macro cell base station to which the mobile terminal is previously connected. However, since a distance from the mobile terminal to the femto cell base station is short, the transmission power for the uplink signal gets diminished and the interference with the macro cell base station gets weakened. As a result, as the whole of a system including the macro cell and femto cell, the throughput can be expected to improve.

However, adoption of the foregoing technique is confronted with two problems that should be solved.

The first problem is how a femto cell base station should control handover, which is a process of connecting a mobile terminal to another base station. Handover is initiated by a mobile terminal itself that is an object or by a base station that is a connection destination from which handover is made. Therefore, the femto cell base station that is a handover destination cannot directly instruct the mobile terminal to make handover to the femto cell base station itself.

The second problem is how to avoid concentration of connections to a femto cell base station. When numerous mobile terminals are connected to the femto cell base station owing to the foregoing technique, a load or a consumption of resources on the femto cell base station increases. Eventually, there arises a possibility that a throughput in a femto cell may decrease.

Accordingly, an object of the present invention is to, when an uplink interference power at a base station such as a femto cell base station is high, raise a probability that a mobile terminal, which is suspected of being a source of interference signal and located on the perimeter of a cell such as a femto cell, may make handover to the femto cell base station, to thus autonomously reduce an uplink interference to be applied to the base station such as the femto cell base station, and to eventually improve a throughput of an entire system.

Another object of the present invention is to suppress an increase in a load on a base station such as a femto cell base station deriving from connection of a mobile terminal to the base station such as the femto cell base station.

Still another object of the present invention is to prevent a mobile terminal, which is not a source of serious interference signal to a base station such as a femto cell base station, from repeating handover from an original connection destination to a cell such as a femto cell or vice versa, by autonomously restoring the radius of the cell such as the femto cell.

In order to solve the above problems, when a femto cell base station relating to the present invention detects an intense uplink interference, the femto cell base station autonomously extends the radius of a femto cell formed by the femto cell base station, and thus raises a probability that a mobile terminal located on the perimeter of the original femto cell may be connected to the femto cell base station itself.

Further, a femto cell base station relating to the present invention evaluates an effect of interference reduction deriving from connection of a mobile terminal, which is located on the perimeter of a femto cell, to the femto cell base station itself as a result of the foregoing action. If the effect is low, the mobile terminal connected to the femto cell base station is returned to a base station that is an original connection destination.

Further, for example, if an evaluative criterion such as a magnitude of interference reduction or the number of connected mobile terminals meets a predetermined condition as a result of extension of the radius of a femto cell, a femto cell base station relating to the present invention restores the extended radius of the femto cell to the original size.

According to a first solution of the present invention, there is provided a wireless communication system including a first base station that forms a first cell and a second base station that forms a second cell which contains the first cell of the first base station or overlaps the first cell.

Herein, the first base station estimates a first radio-wave interference in an uplink direction, which the first base station receives from a group of mobile terminals which wirelessly communicates with another base station or other plural base stations. When the first radio-wave interference is equal to or larger than a predetermined threshold, the first base station increases a transmission power so as to thus extend the radius of the first cell. Thus, out of the group of mobile terminals, one mobile terminal or plural mobile terminals that exist in the expanded first cell and are connected to the second base station are disconnected from the second base station and connected to the first base station.

According to a second solution of the present invention, there is provided a method for wireless communication to be implemented in a wireless communication system including a first base station that forms a first cell and a second base station that forms a second cell which contains the first cell of the first base station or overlaps the first cell.

Herein, the first base station estimates a first radio-wave interference in an uplink direction which the first base station receives from a group of mobile terminals which wirelessly communicates with another base station or other plural base stations. When the first radio-wave interference is equal to or larger than a predetermined threshold, the first base station increases a transmission power so as to extend the radius of the first cell. Thus, out of the group of mobile terminals, one mobile terminal or plural mobile terminals that exist in the expanded first cell and are connected to the second base station are disconnected from the second base station and connected to the first base station.

According to the present invention, when an uplink interference power at a base station such as a femto cell base station is high, a probability that a mobile terminal suspected of being a source of interference signal and located on the perimeter of a cell such as a femto cell may make handover to the femto cell base station gets higher. Therefore, an uplink interference to be applied to the base station such as the femto cell base station is autonomously reduced, and a throughput of an entire system is improved.

In addition, among mobile terminals that have made handover to a base station such as a femto cell base station and are located on the perimeter of a cell such as a femto cell, a mobile terminal that is not a source of serious interference signal to the base station such as the femto cell base station is returned to a base station that is an original connection destination. Further, by autonomously restoring the radius of the cell such as the femto cell, a situation in which numerous mobile terminals are connected to the base station such as the femto cell base station can be avoided. Accordingly, an increase in a load on the base station such as the femto cell base station deriving from connection of a mobile terminal to the base station such as the femto cell base station can be suppressed.

Further, by autonomously restoring the radius of the cell such as the femto cell, a mobile terminal that is not a source of serious interference signal to a base station such as a femto cell base station can be prevented from repeating handover from an original connection destination to the cell such as the femto cell or vice versa.

BRIEF DESCRIPTION OF THE DRAWINGS

The present invention will become fully understood from the detailed description given hereinafter and the accompanying drawings, wherein:

FIG. 2 is a diagram showing the internal configuration of a femto cell base station employed in the first embodiment of the present invention;

FIG. 15 is a flowchart of processing of starting an interference control action in the femto cell base station employed in the first embodiment of the present invention.

DESCRIPTION OF PREFERRED EMBODIMENTS

1. First Embodiment

Figure 1:
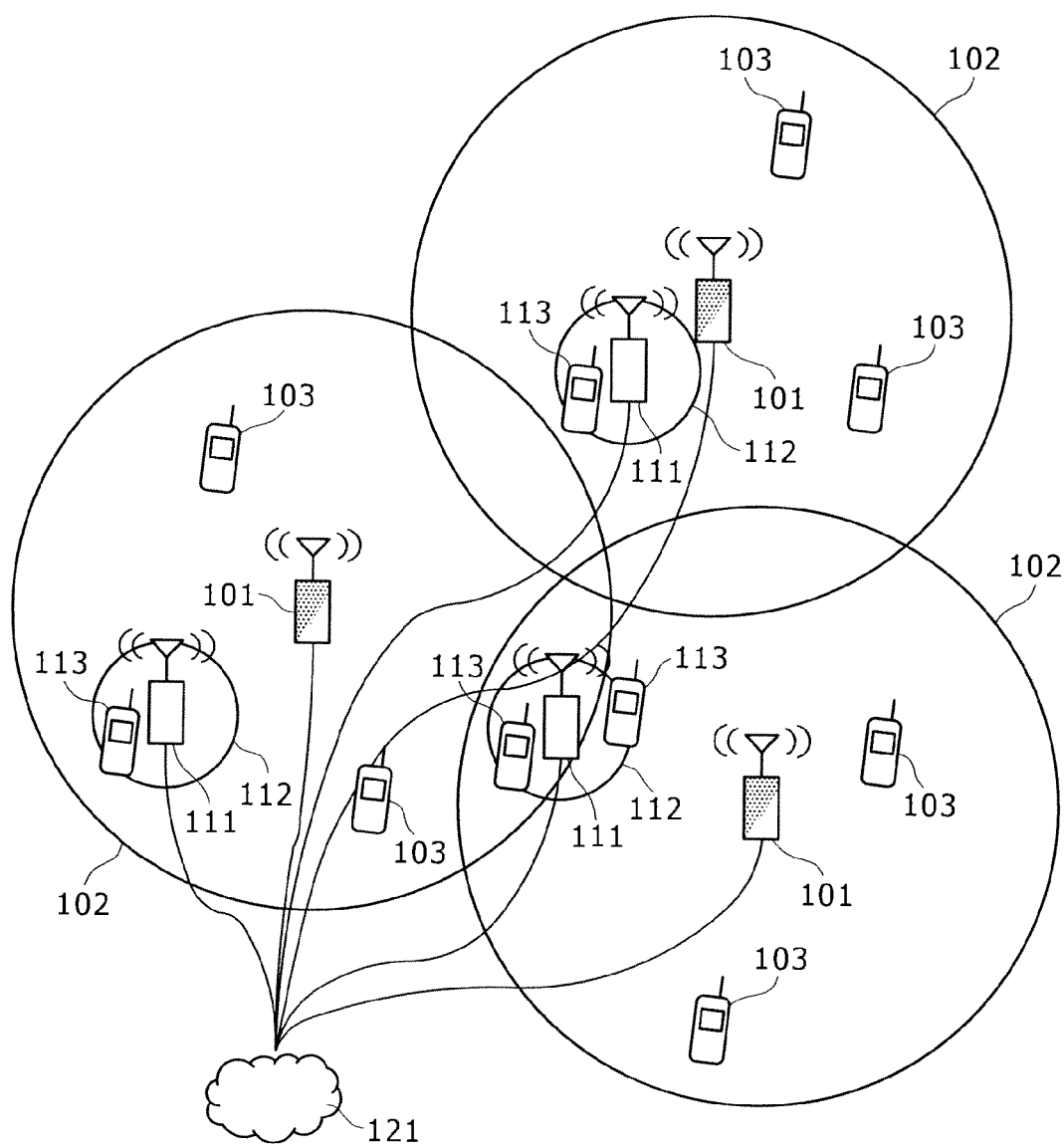
FIG. 1 is a diagram showing the configuration of a cellular wireless communication system in accordance with a first embodiment of the present invention including femto cell base stations.

Referring to the drawings, a first embodiment of the present invention will be described below.

FIG. 1 is a diagram showing an example of the configuration of a cellular wireless communication system in accordance with the first embodiment of the present invention including femto cell base stations.

In the present system, a macro cell base station 101 forms a macro cell 102, and one or more mobile terminals 103 exist in the macro cell 102. The macro cell base station 101 and mobile terminals 103 are connected to one another over wireless links.

A femto cell base station 111 installed in the macro cell 102 forms a femto cell 112, and one or more mobile terminals 113 exist in the femto cell 112. The femto cell base station 111 and mobile terminals 113 are connected to one another over wireless links.

The macro cell base station 101 and femto cell base station 111 are connected to a core network 121 over wired links.

FIG. 2 shows an example of the internal configuration of the femto cell base station 111. The femto cell base station 111 includes a memory 201, a CPU 202, a radio interface 203, a logic circuit 204, and a network interface 205.

The memory 201 preserves a measurement result of received RS (Reference Signal) power 210.

The CPU 202 includes a transmitted data processing unit 211, a received data processing unit 212, a handover processing unit 213, a handover decision unit 214, a transmission power adjustment unit 215, a transmission power reversion decision unit 216, an interference mitigation judgment unit 217, an interference control decision unit 218, and an interference measurement unit 219.

The transmitted data processing unit 211 converts data, which should be transmitted to a mobile terminal, into a radio signal to be transmitted to the mobile terminal over a wireless link.

The received data processing unit 212 extracts data, which a base station should receive, from a radio signal that comes from the mobile terminal over the wireless link.

The handover processing unit 213 performs transmitting/receiving processing on a message to be transferred between base stations at the time of handover, or establishes or releases a wireless link to a mobile terminal.

The handover decision unit 214 uses a report on a result of measurement of a downlink RS power, which is received from a mobile terminal, to decide a cell that is an appropriate connection destination of the mobile terminal.

The transmission power adjustment unit 215 increases or decreases a downlink transmission power of the femto cell base station 111.

When the femto cell base station 111 tentatively increases a downlink transmission power, the transmission power reversion decision unit 216 decides whether the downlink transmission power should be decreased to a value which the downlink transmission power takes on before being increased.

The interference mitigation judgment unit 217 decides whether an uplink interference power received by the femto cell base station 111 has decreased.

The interference control decision unit 218 decides whether the femto cell base station 111 should perform an interference control action.

The interference measurement unit 219 measures the uplink interference power to be received by the femto cell base station 111.

The radio interface 203 is an interface through which the femto cell base station 111 communicates with a mobile terminal over a wireless link.

The logic circuit 204 appends an error-correcting code to data that is transmitted to a mobile terminal, or decodes the data having the error-correcting code appended thereto received from a mobile terminal.

The network interface 205 is an interface through which the femto cell base station 111 communicates with the core network system or another base station over a wired link.

Figure 3:
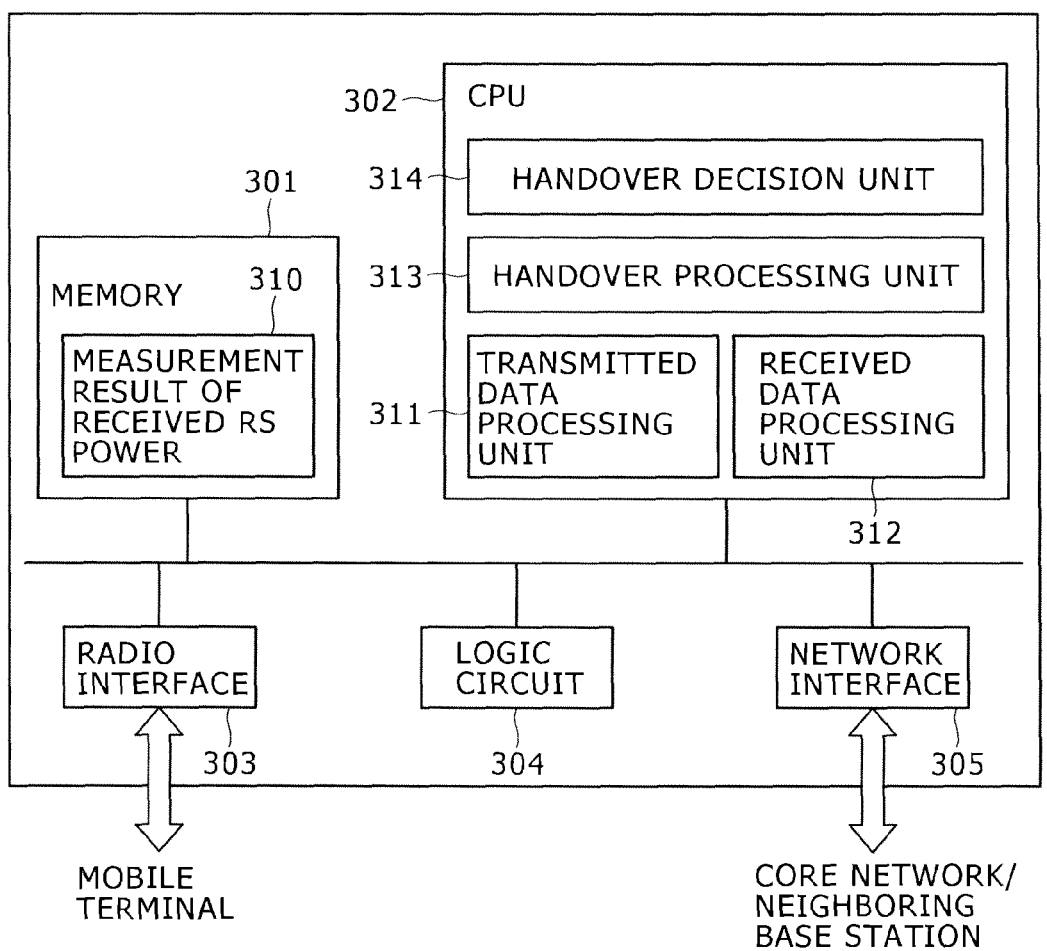
FIG. 3 is a diagram showing the internal configuration of a macro cell base station.

FIG. 3 shows an example of the internal configuration of the macro cell base station 101. The macro cell base station 101 includes a memory 301, a CPU 302, a radio interface 303, a logic circuit 304, and a network interface 305.

The memory 301 preserves a measurement result of received RS power 310.

The CPU 302 includes a transmitted data processing unit 311, a received data processing unit 312, a handover processing unit 313, and a handover decision unit 314. Actions to be performed by these units are identical to those performed by the transmitted data processing unit 211, received data processing unit 212, handover processing unit 213, and handover decision unit 214 respectively included in the femto cell base station 111.

The radio interface 303 is an interface through which the macro cell base station 101 communicates with a mobile terminal over a wireless link.

The logic circuit 304 appends an error-correcting code to data that is transmitted to a mobile terminal, or decodes the data having the error-correcting code appended thereto received from a mobile terminal.

The network interface 305 is an interface through which the macro cell base station 101 communicates with the core network system or another base station over a wired link.

Figure 4:
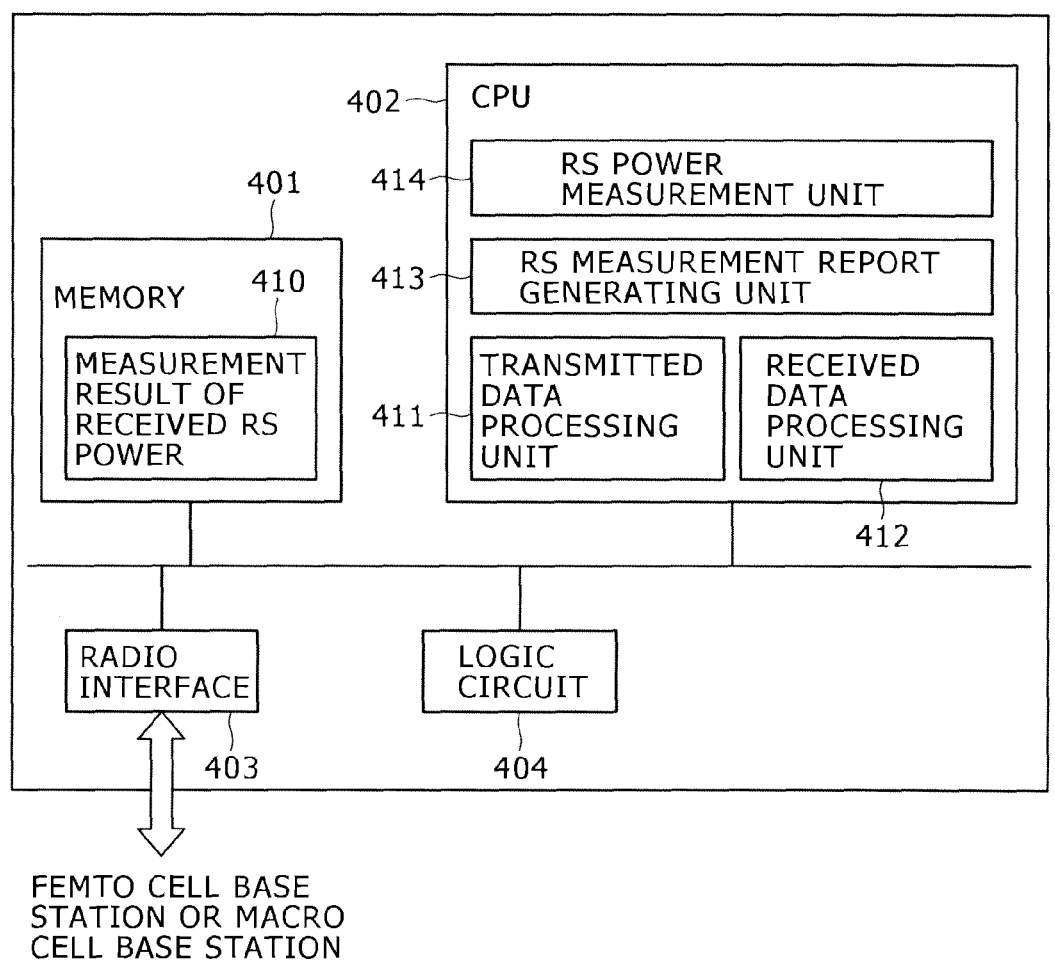
FIG. 4 is a diagram showing the internal configuration of a mobile terminal.

FIG. 4 shows an example of the internal configuration of the mobile terminal 103 or 113. The mobile terminal 103 or 113 includes a memory 401, a CPU 402, a radio interface 403, and a logic circuit 404.

The memory 401 preserves a measurement result of received RS power 410.

The CPU 402 includes a transmitted data processing unit 411, a received data processing unit 412, an RS measurement report generating unit 413, and an RS power measurement unit 414.

The transmitted data processing unit 411 converts data, which should be transmitted to a base station, into a radio signal to be transmitted to the base station over a wireless link.

The received data processing unit 412 extracts data, which a mobile terminal should receive, from the radio signal that comes from the base station over a wireless link.

The RS measurement report generating unit 413 produces a message with which a measured RS power is reported to a base station that is a connection destination.

The RS power measurement unit 414 measures an RS power in a connection-destination cell or neighbor cells.

The radio interface 403 is an interface through which the mobile terminal 103 or 113 communicates with the macro cell base station 101 or femto cell base station 111 over a wireless link.

The logic circuit 404 appends an error-correcting code to data that is transmitted to or received from a base station, or decodes the data having the error-correcting code appended thereto.

Next, an uplink interference control action of the femto cell base station 111 will be described below.

Figure 5A:
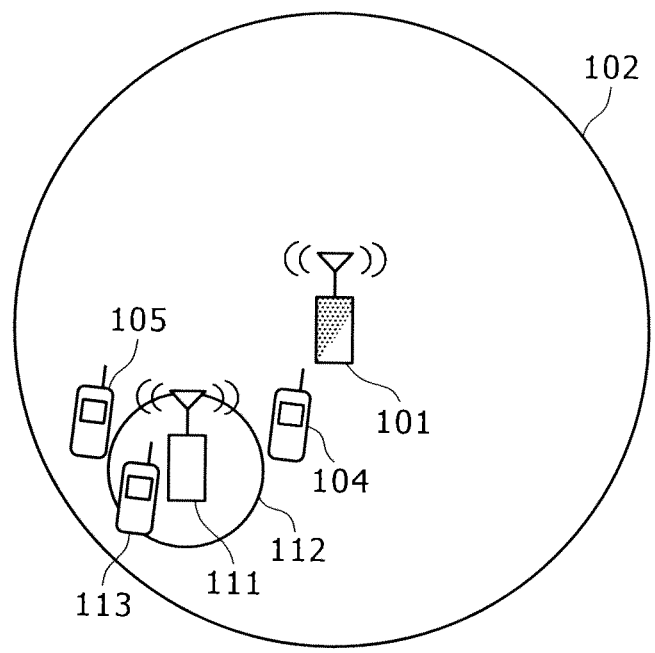
FIG. 5A and FIG. 5B are diagrams showing examples of arrangement of mobile terminals connected to a macro cell base station and a femto cell base station.

As shown in FIG. 5A, a mobile terminal 104 and a mobile terminal 105 shall exist in the macro cell 102, and the mobile terminal 105 shall be located near the border of the femto cell 112.

Figure 6A:
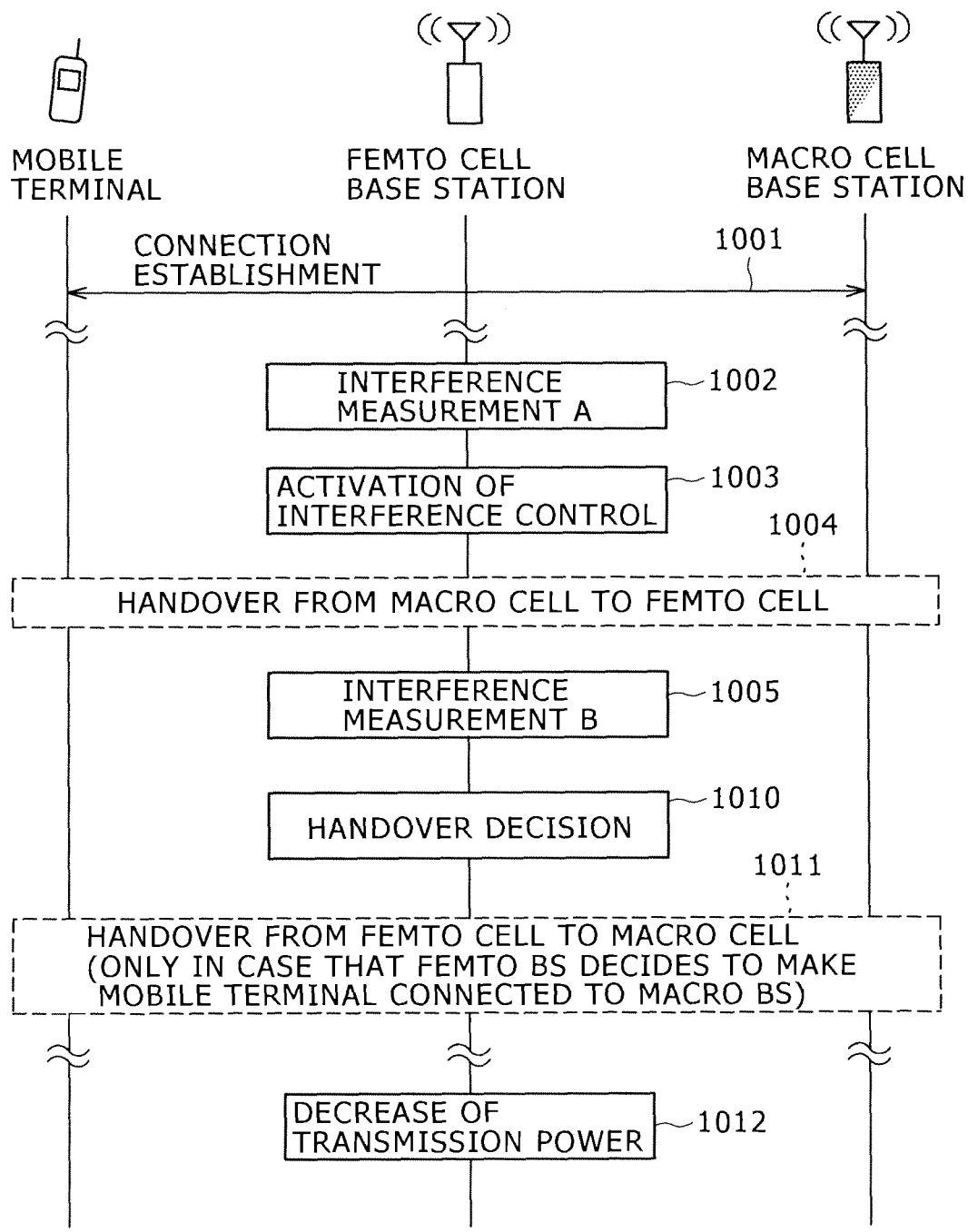
FIG. 6A is a sequence diagram showing a handover procedure to be activated with an increase in a downlink transmission power by the femto cell base station employed in the first embodiment of the present invention.

FIG. 6A shows a sequence for uplink interference control by the femto cell base station 111. Incidentally, actions at respective steps will be detailed later.

The mobile terminals 104 and 105 each establish a connection to the macro cell base station 101 (step 1001).

In the femto cell base station 111, the interference measurement unit 219 measures an uplink interference power at certain timing (step 1002). As a result, if the interference power exceeds a predetermined threshold, the femto cell base station 111 activates an interference control action (step 1003), and handover from the macro cell 102 to the femto cell 112 is executed (step 1004).

Subsequently to step 1004, the interference measurement unit 219 in the femto cell base station 111 measures an uplink interference power again (step 1004). Thereafter, the femto cell base station 111 uses a result of step 1005 to evaluate an effect of interference reduction, and decides whether the mobile terminal should be indwelled in the femto cell 112 (step 1010).

If the femto cell base station 111 decides as a result of step 1010 that the mobile terminal is connected to the macro cell, handover from the femto cell 112 to the macro cell 102 is executed (step 1011).

Thereafter, if the femto cell base station 111 decides at step 1004 that it is unnecessary to transmit a downlink signal with a tentatively increased power, the downlink transmission power is decreased to a transmission power attained prior to step 1004 (step 1012).

FIG. 15 is a flowchart of step 1003.

The interference control decision unit 218 decides whether the value of an interference power A measured at step 1002 is equal to or larger than a predetermined threshold "g" (step 2601).

The value of an interference power can be measured, for example, as mentioned below. Specifically, each base station has a period during which transmissions from all mobile terminals connected to the own base station is stopped. A power measured during the period is a power of radio waves received from one or plural mobile terminals that are not connected to the own base station. Therefore, the base station can measure the power as an interference power.

If it is found as a result of step 2601 that the interference power A is equal to or larger than the threshold "g", the interference control decision unit 218 decides starting of interference control (step 2602).

In contrast, if the interference power A falls below the threshold "g", the interference control decision unit 218 terminates its action without doing anything.

Figure 7:
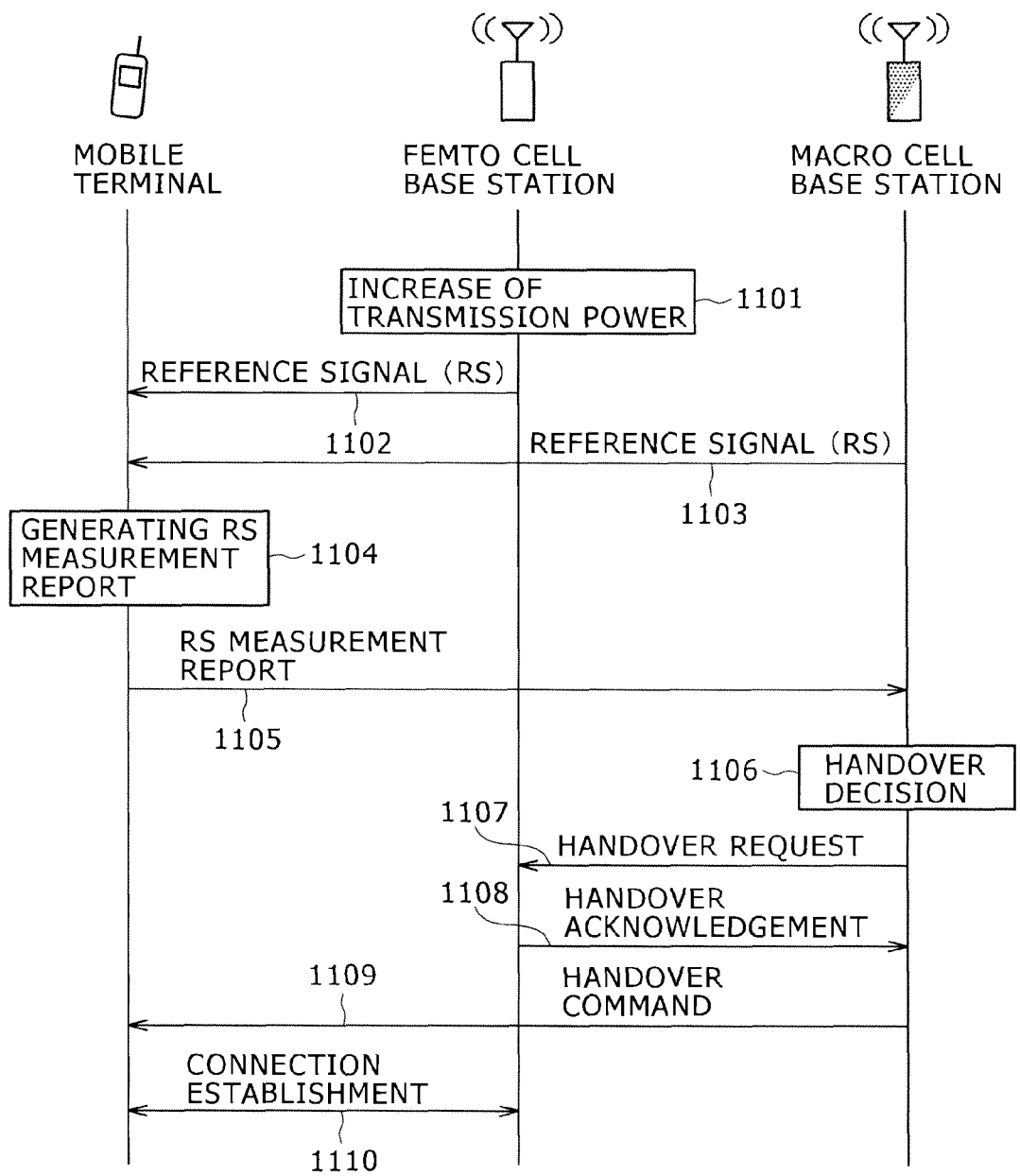
FIG. 7 is a sequence diagram showing a detailed procedure of the handover from a macro cell base station to the femto cell base station included in the procedure mentioned in FIG. 6A or FIG. 6B.

FIG. 7 shows a detailed sequence of step 1004.

The femto cell base station 111 activates an interference control action at step 1003, and increases a downlink transmission power (step 1101). Accordingly, as shown in FIG. 5B, the radius of the femto cell 112 is extended.

Thereafter, the femto cell base station 111 and macro cell base station 101 each transmit a downlink RS (steps 1102 and 1103). Incidentally, the downlink RS is regularly transmitted from each of the base stations. A mobile terminal creates a report on a result of measurement of the power of the downlink RS received from each of the base stations (step 1104), and transmits the report to the macro cell base station 101 (step 1105).

The macro cell base station 101 decides an appropriate connection destination of the mobile terminal on the basis of the contents of the report on the result of measurement of the downlink RS power received at step 1105 (step 1106). At this time, since the transmission power for a downlink RS transmitted from the femto cell base station 111 has been tentatively increased due to step 1101, and the radius of the femto cell 112 has been extended, a probability that the femto cell 112 may be selected at step 1106 gets higher.

Figure 5B:
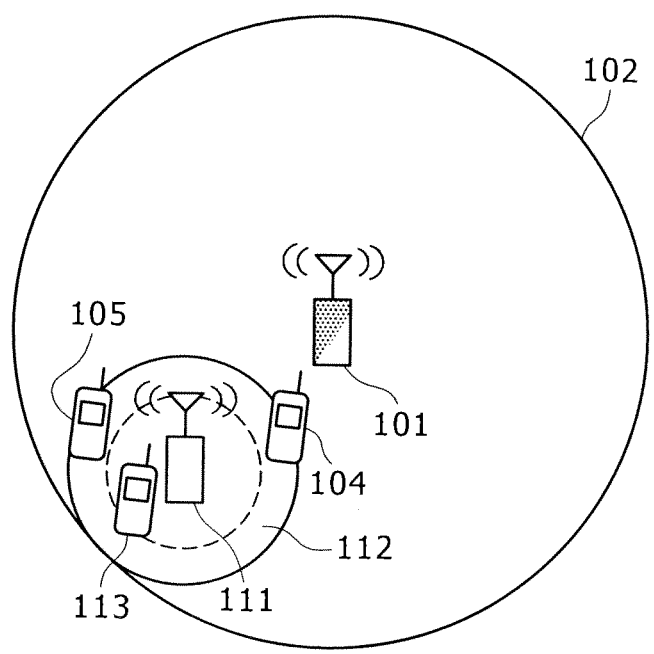

In the example shown in FIG. 5B, both the mobile terminals 104 and 105 exist in the femto cell 112 whose radius has been extended. Therefore, the mobile terminals each report a result of measurement, which signifies that a receiving power of a downlink RS in the femto cell 112 is high, to the macro cell base station. The macro cell base station 101 decides based on the report of the result of measurement, which is received at step 1106, that the mobile terminals 104 and 105 should be handed over to the femto cell 112.

If handover to the femto cell 112 is activated at step 1106, the macro cell base station 101 transmits a handover request to the femto cell base station 111 (step 1107). If the femto cell base station 111 can accept handover, the femto cell base station 111 transmits a handover acknowledgement to the macro cell base station 101 (step 1108).

When the macro cell base station 101 receives the handover acceptance response from the femto cell base station 111, the macro cell base station 101 instructs the mobile terminal to make handover to the femto cell 112 (step 1109).

When the mobile terminal is instructed to make handover to the femto cell 112, the mobile terminal establishes a connection to the femto cell base station 111 (step 1110).

Figure 8:
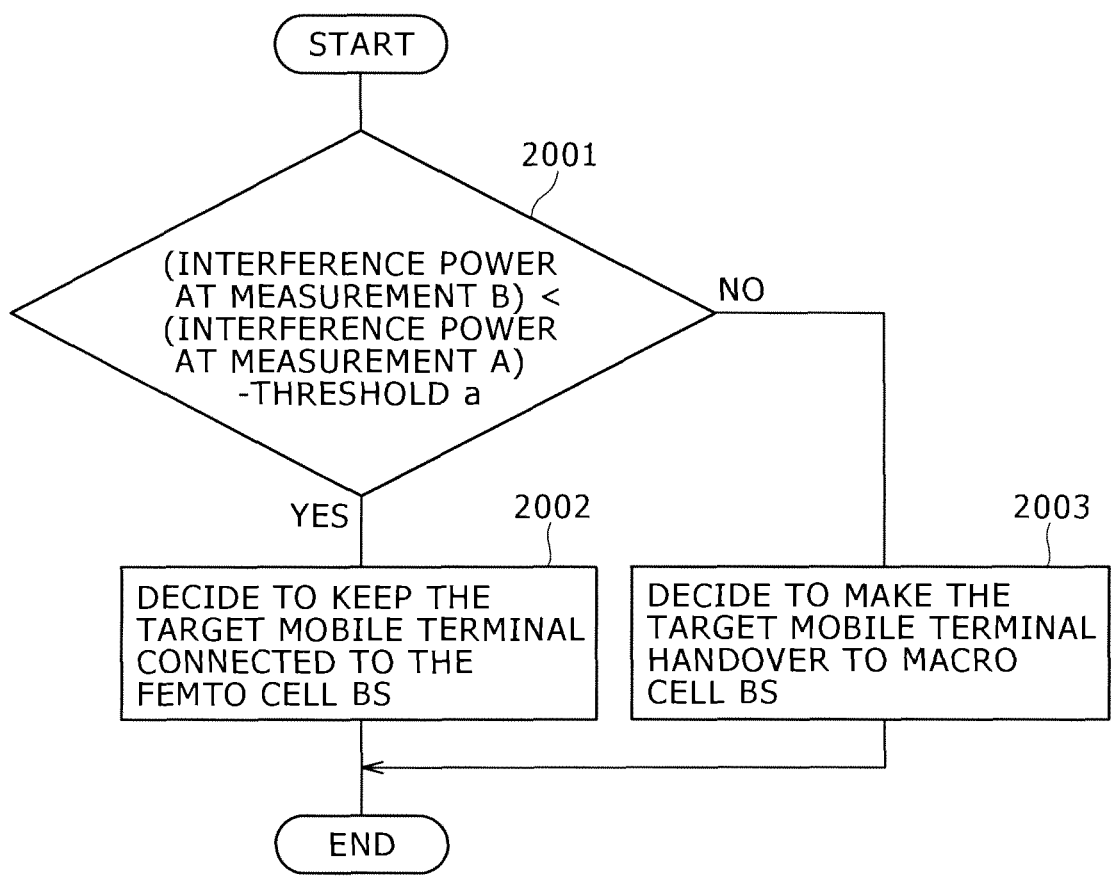
FIG. 8 is a flowchart of processing of deciding whether an effect of interference reduction is exerted in the femto cell base station employed in the first embodiment of the present invention.

FIG. 8 is a flowchart describing step 1010.

A mobile terminal that is handed over to the femto cell base station 111 because the radius of the femto cell is extended is no longer a source of interference signal to the femto cell base station 111. Therefore, an interference power is expected to decrease accordingly. In this processing flow, at step 2001, the degree of the decrease is recognized, and only a mobile terminal that offers a large degree of decrease remains connected to the femto cell base station 111, but a mobile terminal that offers a small degree of decrease is handed over to the macro cell base station 101.

The interference mitigation judgment unit 217 decides whether an interference power B measured by the interference measurement unit 219 at step 1004 has decreased by a predetermined threshold "a" or more with respect to the interference power A measured by the interference measurement unit 219 at step 1002 (step 2001), and passes the result of the decision to the handover decision unit 214.

If it is found as a result of step 2001 that the interference power B has decreased by the threshold "a" or more with respect to the interference power A, the handover decision unit 214 decides to keep the target mobile terminal connected to the femto cell base station 111 (step 2002).

In contrast, if the interference power B has not decreased by the threshold "a" or more with respect to the interference power A, the handover decision unit 214 decides to the target mobile terminal handover to the macro cell base station 101 (step 2003).

The processing mentioned in FIG. 8 is executed successively to every completion of step 1004.

In the example shown in FIG. 5B, the mobile terminal 105 is located quite close to the femto cell 112 whose radius has not been extended. Therefore, before the mobile terminal 105 is handed over to the femto cell 112, an uplink signal sent from the mobile terminal 105 becomes an intense interference signal to the femto cell base station. Therefore, as for the mobile terminal 105, the interference power B largely decreases with respect to the interference power A. As a result of step 2001, the mobile terminal 105 is left connected to the femto cell base station 111.

In contrast, the mobile terminal 104 is not located very close to the femto cell 112 whose radius has not been extended. Therefore, before the mobile terminal 104 is handed over to the femto cell 112, an uplink signal from the mobile terminal 104 is not an intense interference signal to the femto cell base station. Therefore, as for the mobile terminal 104, the interference power B does not decrease very much with respect to the interference power A. As a result of step 2001, the mobile terminal 104 is handed over to the macro cell base station 101.

Figure 11:
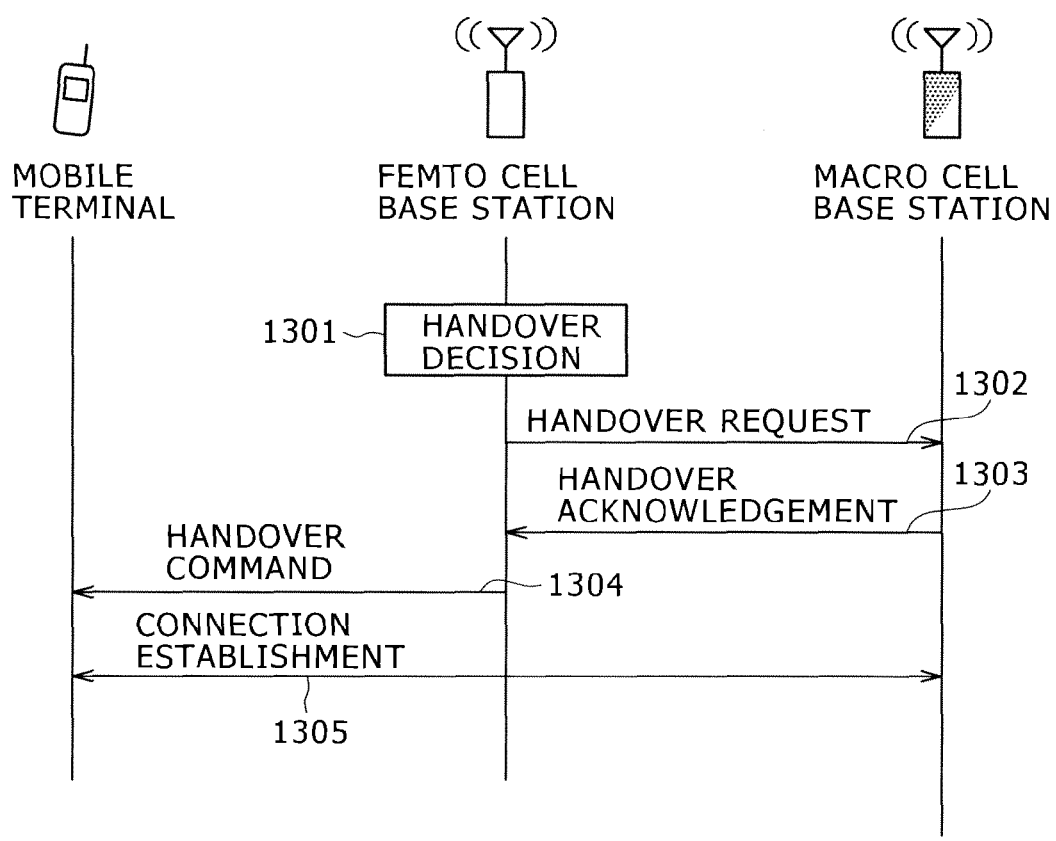
FIG. 11 is a sequence diagram showing a detailed procedure of handover from the femto cell base station to the macro cell base station included in the procedure mentioned in FIG. 6.

FIG. 11 shows a detailed sequence of step 1011.

When handover to the macro cell 102 is activated at step 1301, the femto cell base station 111 transmits a handover request to the macro cell base station 101 (step 1302).

If the macro cell base station 101 can accept handover, the macro cell base station 101 transmits a handover acceptance response to the femto cell base station 111 (step 1303).

When the femto cell base station 111 receives the handover acceptance response from the macro cell base station 101, the femto cell base station 111 instructs a mobile terminal to make handover to the macro cell 102 (step 1304).

When the mobile terminal is instructed to make handover to the macro cell 102, the mobile terminal establishes a connection to the macro cell base station 101 (step 1305).

Figure 12:
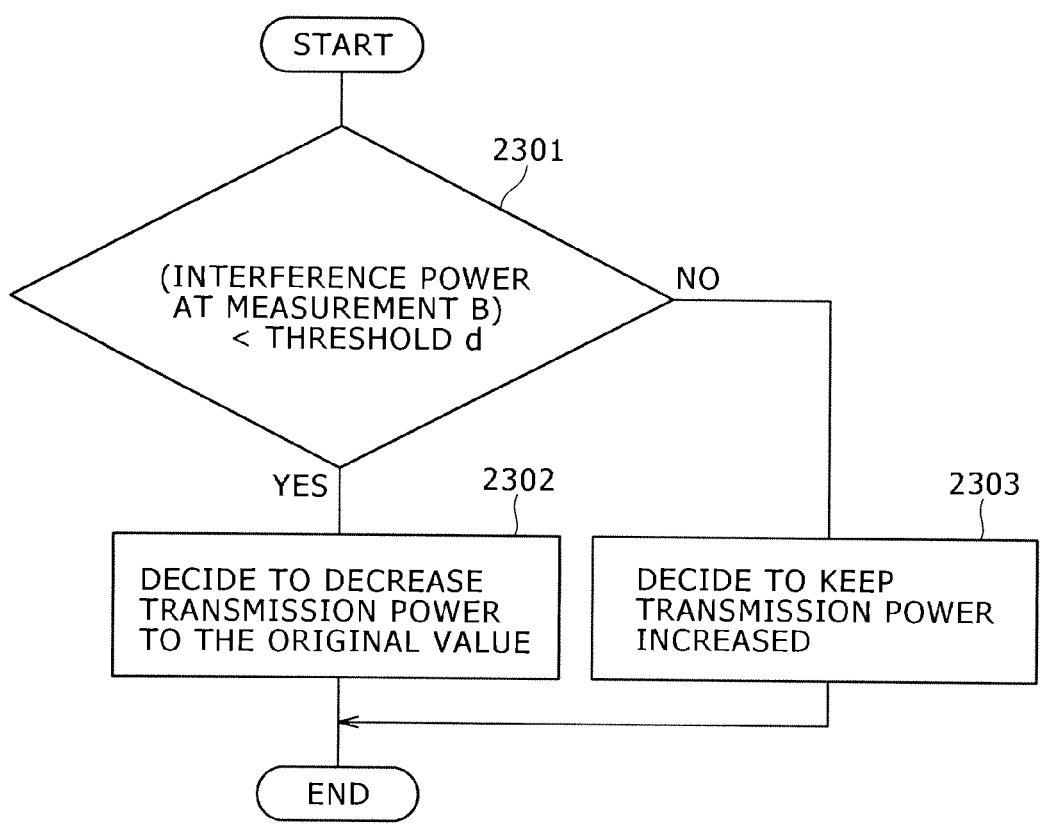
FIG. 12 is a flowchart of processing of deciding whether it is necessary to perform an action of restoring a downlink transmission power of the femto cell base station, which is employed in the first embodiment of the present invention, to an original value.

FIG. 12 shows a processing flow of step 1012.

The interference mitigation judgment unit 217 decides whether the value of the interference power B measured by the interference measurement unit 219 at step 1004 falls below a predetermined threshold "d" (step 2301), and passes the result of the decision to the transmission power reversion decision unit 216.

If it is found as a result of step 2301 that the interference power B falls below the threshold "d", the transmission power reversion decision unit 216 decides to decrease a downlink transmission power to the value attained prior to step 1004 (step 2302), and instructs the transmission power adjustment unit 215 to decrease the downlink transmission power.

In contrast, if the interference power B is equal to or larger than the threshold "d", the transmission power reversion decision unit 216 decides to keep the downlink transmission power at the value increased at step 1004 (step 2303).

The femto cell base station 111 may execute the series of pieces of processing mentioned in FIG. 12 every after executing step 1004 or may comprehensively execute the series of pieces of processing after executing step 1004 for plural mobile terminals.

2. Second Embodiment

Now, a second embodiment of the present invention will be described below.

The present embodiment is different from the first embodiment in actions to be performed at step 1006 and subsequent steps. In particular, actions for handover necessity decision (step 1010') and for power decrease (step 1012') are different from those of steps 1010 and 1012 in the first embodiment. In addition, since the action for handover necessity decision (step 1010') is different, an uplink interference control action sequence is different.

Figure 6B:
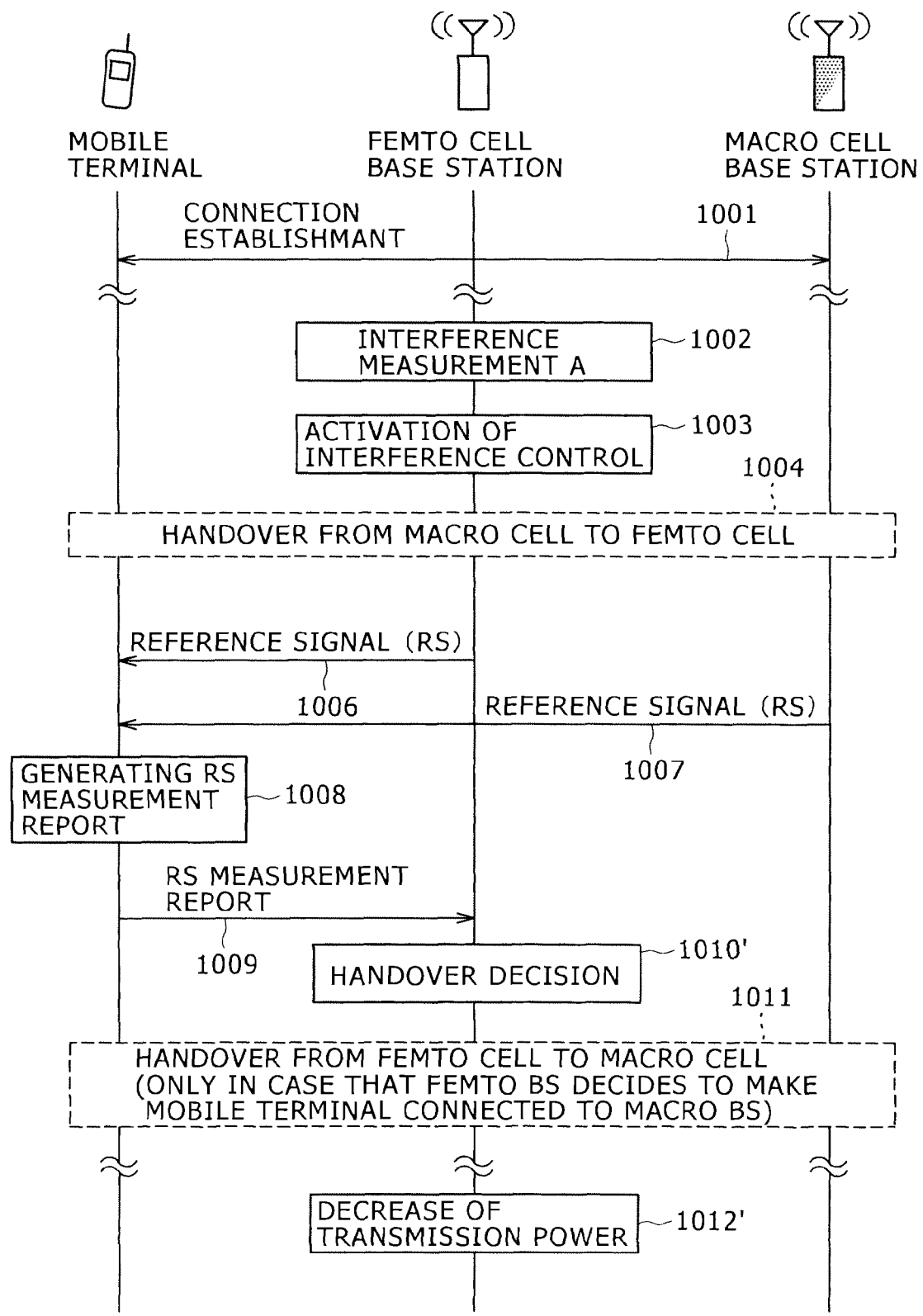
FIG. 6B is a sequence diagram showing a handover procedure to be activated with an increase in a downlink transmission power by a femto cell base station employed in a second or third embodiment of the present invention.

FIG. 6B shows an uplink interference control sequence to be followed by the femto cell base station 111.

Actions of steps 1001 to 1004 are identical to those in the first embodiment mentioned in FIG. 6A.

The femto cell base station 111 and macro cell base station 101 each regularly transmit a downlink RS. Therefore, an opportunity to transmit the downlink RS from each base station succeeds to step 1004 (steps 1006 and 1007). A mobile terminal creates a report on a result of measurement of the power of the downlink RS received from each of the base stations (step 1008), and transmits the report to the femto cell base station 111 (step 1009).

On receipt of the report on the result of measurement of the power of the downlink RS from the mobile terminal at step 1009, the femto cell base station 111 decides at step 1010' whether the mobile terminal should be indwelled in the femto cell 112.

Actions to be performed at step 1011 and subsequent steps are identical to those in the first embodiment mentioned in FIG. 6A. If it is decided as a result of step 1010' that the femto cell base station 111 connects the mobile terminal to a macro cell, handover from the femto cell 112 to the macro cell 102 is executed (step 1011).

Thereafter, if the femto cell base station 111 decides that it is unnecessary to transmit a downlink signal with a power tentatively increased at step 1004, the femto cell base station 111 decreases the downlink transmission power to the value attained prior to step 1004 (step 1012').

Figure 9:
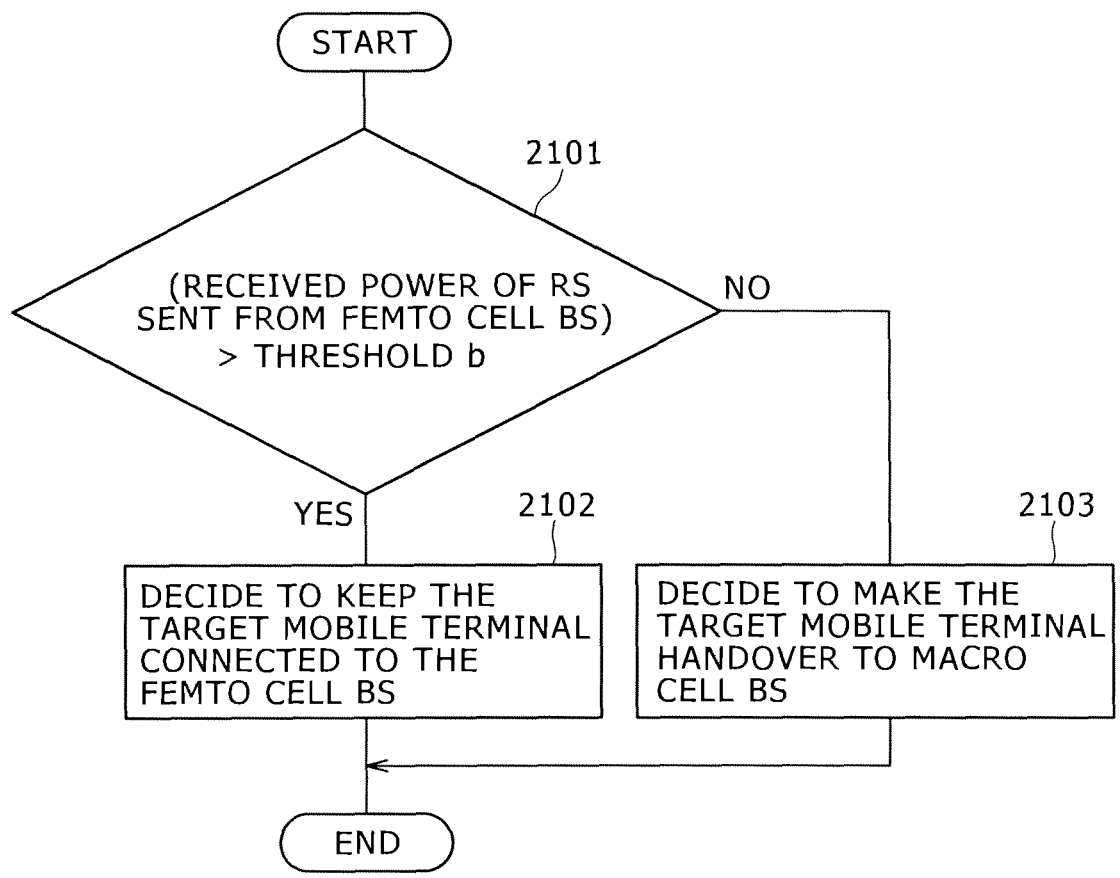
FIG. 9 is a flowchart of processing of deciding whether an effect of interference reduction is exerted in the femto cell base station employed in the second embodiment of the present invention.

FIG. 9 is a flowchart of step 1010' in the second embodiment of the present invention.

The interference mitigation judgment unit 217 decides whether a downlink RS receiving power which is notified by a mobile terminal at step 1009 and is relevant to the femto cell base station 111 is equal to or larger than a predetermined threshold "b" (step 2101), and passes the result of the decision to the handover decision unit 214.

If it is found as a result of step 2101 that the downlink RS receiving power relevant to the femto cell base station 111 is larger than the threshold "b", the handover decision unit 214 decides to keep the mobile terminal connected to the femto cell base station 111 (step 2102).

In contrast, if the downlink RS receiving power relevant to the femto cell base station 111 is smaller than the threshold "b", the handover decision unit 214 decides to the target mobile terminal handover to the macro cell base station 101 (step 2103).

Incidentally, the femto cell base station 111 may execute the series of pieces of processing mentioned in FIG. 9 every after executing step 104 or may comprehensively execute the series of pieces of processing after executing step 104 for plural mobile terminals.

Figure 13:
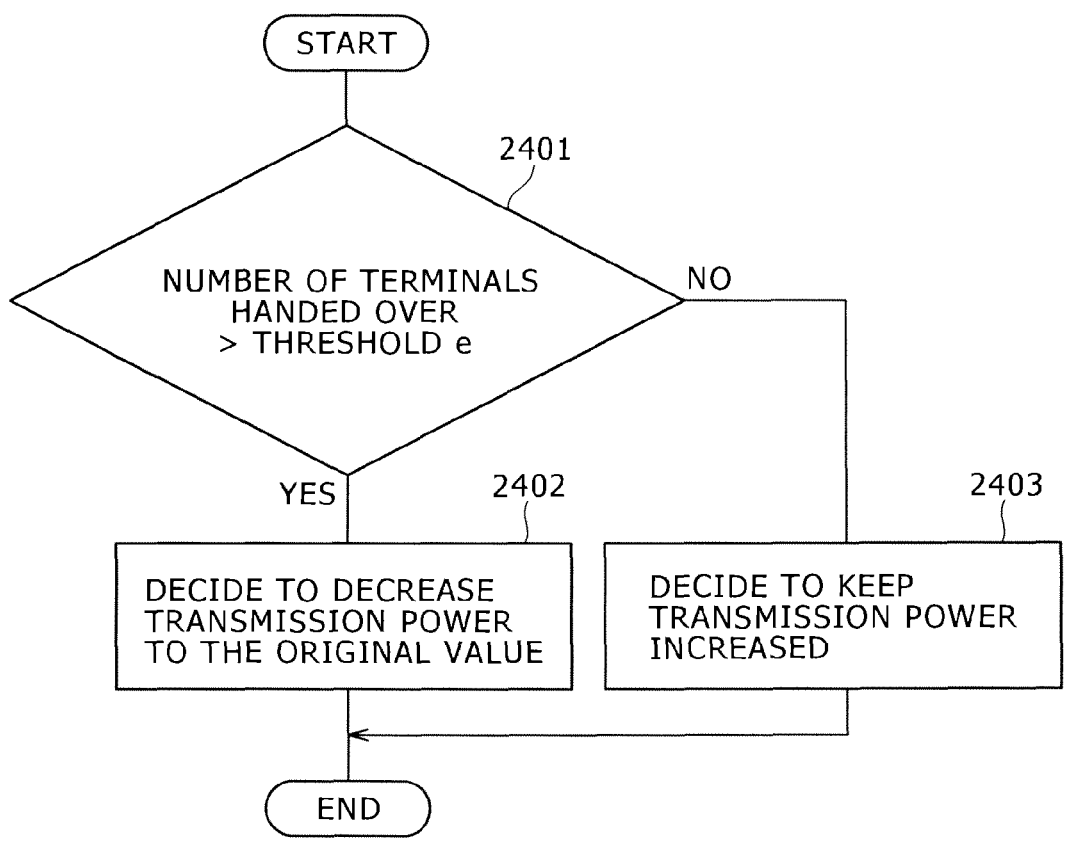
FIG. 13 is a flowchart of processing of deciding whether it is necessary to perform an action of restoring a downlink transmission power of the femto cell base station, which is employed in the second embodiment of the present invention, to an original value.

FIG. 13 is a flowchart of step 1012' in the second embodiment of the present invention.

The transmission power reversion decision unit 216 decides whether the number of mobile terminals handed over to the femto cell 112 at step 1004 is larger than a predetermined threshold "e" (step 2401).

If it is found as a result of step 2401 that the number of mobile terminals handed over to the femto cell 112 is larger than the threshold "e", the transmission power reversion decision unit 216 decides to decrease the downlink transmission power so as to decrease it to the value attained prior to step 1004 (step 2402), and instructs the transmission power adjustment unit 215 to decrease the downlink transmission power.

In contrast, if the number of mobile terminals handed over to the femto cell 112 is equal to or smaller than the threshold "e", the transmission power reversion decision unit 216 decides to keep the downlink transmission power at the value increased at step 1004 (step 2403).

Incidentally, the femto cell base station 111 may execute the series of pieces of processing mentioned in FIG. 13 every after executing step 1004 or may comprehensively execute the series of pieces of processing after executing step 104 for plural mobile terminals.

3. Third Embodiment

A third embodiment of the present invention will be described below. In the present embodiment, a sequence for uplink interference control to be followed by the femto cell base station 111 is, as mentioned in FIG. 6B, identical to that in the second embodiment, but actions at steps 1010' and 1012' are different from those in the second embodiment.

Figure 10:
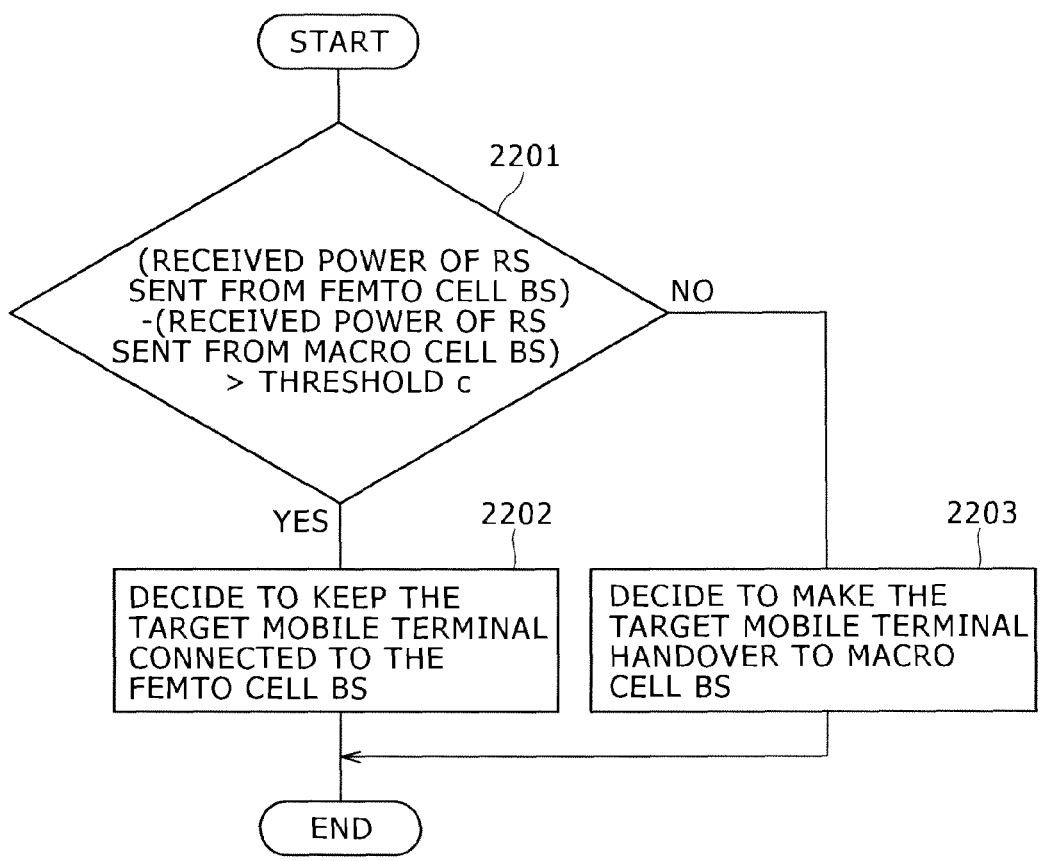
FIG. 10 is a flowchart of processing of deciding whether an effect of interference reduction is exerted in the femto cell base station employed in the third embodiment of the present invention.

FIG. 10 is a flowchart of step 1010' in the third embodiment of the present invention.

The interference mitigation judgment unit 217 decides whether a difference between a downlink RS receiving power that is relevant to the femto cell base station 111 and notified by a mobile terminal at step 1009 in FIG. 6B, and a downlink RS receiving power relevant to the macro cell base station 101 is equal to or larger than a predetermined threshold "c" (step 2201), and passes the result of the decision to the handover decision unit 214.

If it is found as a result of step 2201 that the difference between the downlink RS receiving power relevant to the femto cell base station 111 and the downlink RS receiving power relevant to the macro cell base station 101 is larger than the threshold "c", the handover decision unit 214 decides to keep the target mobile terminal connected to the femto cell base station 111 (step 2202).

In contrast, if the difference between the downlink RS receiving power relevant to the femto cell base station 111 and the downlink RS receiving power relevant to the macro cell base station 101 is smaller than the threshold "c", the handover decision unit 214 decides to make the target mobile terminal handover to the macro cell base station 101 (step 2203).

Incidentally, the femto cell base station 111 may execute the series of pieces of processing, which is mentioned in FIG. 10, every after executing step 1004 or may comprehensively execute the series of pieces of processing after executing step 1004 for plural mobile terminals.

Figure 14:
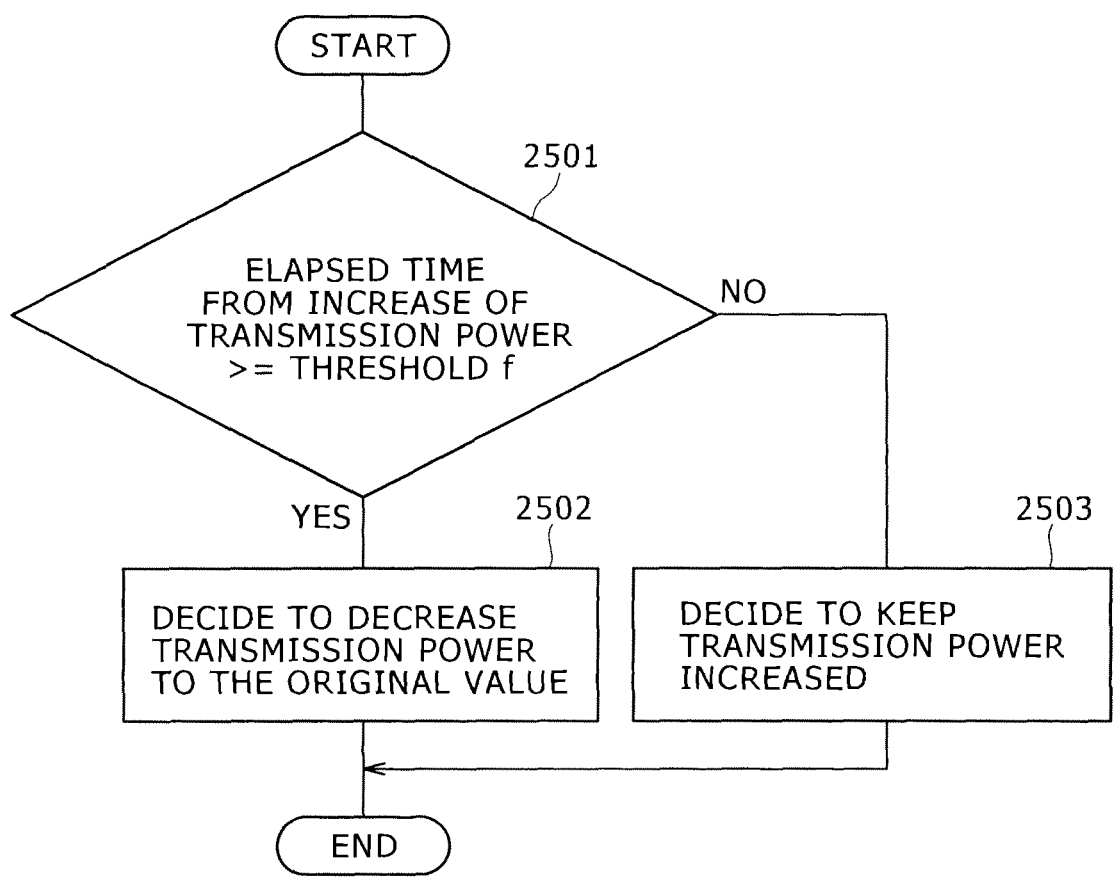
FIG. 14 is a flowchart of processing of deciding whether it is necessary to perform an action of restoring a downlink transmission power of the femto cell base station, which is employed in the third embodiment of the present invention, to an original value.

FIG. 14 is a flowchart of step 1012' in the third embodiment of the present invention.

The transmission power reversion decision unit 216 decides whether an elapsed time having elapsed since a transmission power of the femto cell base station 111 is increased at step 1101 in FIG. 6B is equal to or larger than a predetermined threshold "f" (step 2501).

If it is found as a result of step 2501 that the elapsed time is equal to or larger than the threshold "f", the transmission power reversion decision unit 216 decides to decrease a downlink transmission power to the value attained prior to step 1004 (step 2502), and instructs the transmission power adjustment unit 215 to decrease the downlink transmission power.

In contrast, if the elapsed time falls below the threshold "f", the transmission power reversion decision unit 216 decides to keep the downlink transmission power at the value increased at step 1004 (step 2503).

Incidentally, the femto cell base station 111 may execute the series of pieces of processing, which is mentioned in FIG. 24, every after executing step 1004, or may comprehensively execute the series of pieces of processing after executing step 1004 for plural mobile terminals.

4. Modification

In relation to the three aforesaid embodiments, three methods mentioned in FIG. 8, FIG. 9, and FIG. 10 are introduced as handover necessity decision (step 1010 or step 1010'), and three methods mentioned in FIG. 12, FIG. 13, and FIG. 14 are introduced as power decrease (step 1012 or step 1012'). An example of a combination of a handover necessity decision method (step 1010 or step 1010') and a power decrease method (step 1012 or step 1012') has been cited in relation to each of the embodiments. However, the present invention is not limited to the combinations but permits selection of appropriate methods. As for power decrease (step 1012 or step 1012'), two or more of the methods mentioned in FIG. 12, FIG. 13, and FIG. 14 may be combined.

Handover especially between a femto cell base station and a macro cell base station has been described so far. However, the present invention is not limited to the handover between the femto cell base station and macro cell base station, but can be applied to handover between femto cell base stations, handover between macro cell base stations, handover between other base stations, or handover between different types of base stations or between base stations of the same type.

What is claimed is:

1. A wireless communication system comprising:
a first base station configured to form a first cell; and
a second base station configured to form a second cell which contains the first cell of the first base station or overlaps the first cell,
wherein:
the first base station is configured to estimate a first radio-wave interference in an uplink direction which the first base station receives from a group of mobile terminals which are configured to communicate wirelessly with another base station or a plurality of other base stations;
when the first radio-wave interference is equal to or larger than a predetermined threshold, the first base station is configured to control a transmission power of the first base station to raise a probability that one or more mobile terminals connected to the second base station may make handovers from the second base station to the first base station; and
from the group of mobile terminals, one or more mobile terminals that exist in a perimeter of the first cell and that are connected to the second base station are disconnected from the second base station and connected to the first base station;
the first base station is configured to evaluate an effect of interference reduction deriving from connection of the one or more mobile terminals to the first base station itself; and
when the effect is low, the one or more mobile terminals connected to the first base station are returned to the second base station that is an original connection destination.

2. The wireless communication system according to claim 1,
wherein during the evaluation of the effect of interference reduction:
when a first mobile terminal from the group of mobile terminals is disconnected from the second base station and connected to the first base station, the first base station is configured to estimate a second radio-wave interference in the uplink direction, which the first base station receives from the group of mobile terminals which are configured to communicate wirelessly with another base station or a plurality of other base stations;
when the second radio-wave interference has decreased by a predetermined threshold or more with respect to the first radio-wave interference, the first base station is configured to evaluate whether the effect of interference reduction meets a predetermined condition and to keep the first mobile terminal connected; and
when the second radio-wave interference has not decreased by the threshold or more, the first base station is configured to evaluate whether the effect of interference reduction is low and to make the first mobile terminal handover to the second base station.

3. The wireless communication system according to claim 1,
wherein during the evaluation of the effect of interference reduction:
when a first mobile terminal from the group of mobile terminals is disconnected from the second base station and connected to the first base station, the first base station is configured to receive a report on a result of measurement of a first receiving power at the first mobile terminal of a reference signal transmitted from the first base station;
when the first receiving power is larger than a predetermined threshold, the first base station is configured to evaluate whether the effect of interference reduction meets a predetermined condition and to keep the first mobile terminal connected; and
when the first receiving power is not larger than the threshold, the first base station is configured to evaluate whether the effect of interference reduction is low and to make the first mobile terminal handover to the second base station.

4. The wireless communication system according to claim 1,
wherein during the evaluation of the effect of interference reduction:
when a first mobile terminal from the group of mobile terminals is disconnected from the second base station and connected to the first base station, the first base station is configured to receive a report on a result of measurement of a first receiving power at the first mobile terminal of a reference signal transmitted from the first base station, and a report on a result of measurement of a second receiving power at the first mobile terminal of a reference signal transmitted from the second base station;
when the difference between the first receiving power and second receiving power is larger than a predetermined threshold, the first base station is configured to evaluate whether the effect of interference reduction meets a predetermined condition and to keep the first mobile terminal connected; and
when the difference is not larger than the threshold, the first base station is configured to evaluate whether the effect of interference reduction is low and to make the first mobile terminal handover to the second base station.

5. The wireless communication system according to claim 1,
wherein,
after the transmission power of the first base station is controlled to raise a probability that the one or more mobile terminals which are connected to the second base station may make handovers from the second base station to the first base station,
when the second radio-wave is equal to or smaller than the predetermined threshold,
the transmission power of the first base station is controlled to the original value.

6. The wireless communication system according to claim 1,
wherein,
after the transmission power of the first base station is controlled to raise a probability that the one or more mobile terminals which are connected to the second base station may make handovers from the second base station to the first base station,
when a number of mobile terminals, which is connected to the first base station and belongs to the group of mobile terminals, becomes equal to or larger than a certain value,
the transmission power of the first base station is controlled to the original value.

7. The wireless communication system according to claim 1,
wherein,
after the transmission power of the first base station is controlled to raise a probability that the one or more mobile terminals which are connected to the second base station may make handover from the second base station to the first base station,
when a certain time has elapsed,
the transmission power of the first base station is controlled to the original value.

8. The wireless communication system according to claim 1,
wherein the first base station is a femto cell base station and the second base station is a macro cell base station.

9. A method for wireless communication to be implemented in a wireless communication system, which includes a first base station configured to form a first cell and a second base station configured to form a second cell which contains the first cell of the first base station or overlaps the first cell, the method comprising:
estimating, using the first base station, a first radio-wave interference in an uplink direction which the first base station receives from a group of mobile terminals which are configured to communicate wirelessly with another base station or a plurality of other base stations;
controlling, using the first base station, when the first radio-wave interference is equal to or larger than a predetermined threshold, a transmission power of the first base station to raise a probability that mobile terminals which are connected to the second base station may make handovers from the second base station to the first base station;
disconnecting one or more mobile terminals from the group of mobile terminals from the second base station and connecting the one or more mobile terminals to the first base station, the one or more mobile terminals existing in the perimeter of the first cell;
evaluating an effect of interference reduction deriving from connection of the one mobile terminal or a plurality of mobile terminals to the first base station itself; and
returning, when the effect is low, the one or more mobile terminals connected to the first base station to the second base station that is an original connection destination.

10. The method for wireless communication according to claim 9,
wherein a value of the radio-wave interference and a result of the evaluating step of the effect of interference reduction are estimated based on a power measured during a period during which all mobile terminals connected to their respective base stations cease transmission.

* * * * *